(12) United States Patent
Thyni et al.

(10) Patent No.: US 8,542,682 B2
(45) Date of Patent: Sep. 24, 2013

(54) SYSTEMS AND METHODS FOR MEDIA DISTRIBUTION

(75) Inventors: Thomas Thyni, Järfälla (SE); Mats Ullerstig, Spånga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 184 days.

(21) Appl. No.: 12/937,270

(22) PCT Filed: Apr. 24, 2008

(86) PCT No.: PCT/IB2008/051596
§ 371 (c)(1),
(2), (4) Date: Dec. 30, 2010

(87) PCT Pub. No.: WO2009/130541
PCT Pub. Date: Oct. 29, 2009

(65) Prior Publication Data
US 2011/0134808 A1    Jun. 9, 2011

(51) Int. Cl.
*H04L 12/28*    (2006.01)

(52) U.S. Cl.
USPC ............................ 370/390; 370/432

(58) Field of Classification Search
None
See application file for complete search history.

(56) References Cited

U.S. PATENT DOCUMENTS

| | | | |
|---|---|---|---|
| 6,973,081 B1 | 12/2005 | Patel | |
| 2005/0259682 A1* | 11/2005 | Yosef et al. | 370/468 |
| 2006/0047845 A1 | 3/2006 | Whited et al. | |
| 2006/0126667 A1* | 6/2006 | Smith et al. | 370/486 |
| 2006/0200576 A1* | 9/2006 | Pickens et al. | 709/231 |
| 2006/0242311 A1* | 10/2006 | Mai et al. | 709/229 |
| 2007/0165633 A1* | 7/2007 | Ikegami et al. | 370/390 |
| 2007/0168523 A1* | 7/2007 | Jiang et al. | 709/228 |
| 2007/0217436 A1* | 9/2007 | Markley et al. | 370/401 |
| 2007/0283397 A1* | 12/2007 | Scholl | 725/86 |
| 2008/0109557 A1* | 5/2008 | Joshi et al. | 709/231 |
| 2008/0109853 A1* | 5/2008 | Einarsson et al. | 725/62 |
| 2009/0031392 A1* | 1/2009 | VerSteeg et al. | 725/151 |
| 2009/0059832 A1* | 3/2009 | Jhamnani et al. | 370/312 |
| 2009/0094639 A1* | 4/2009 | Haberman et al. | 725/34 |
| 2009/0147718 A1* | 6/2009 | Liu et al. | 370/312 |
| 2009/0165043 A1* | 6/2009 | Ou et al. | 725/38 |
| 2010/0017463 A1* | 1/2010 | Horn et al. | 709/203 |
| 2011/0164614 A1* | 7/2011 | Begeja | 370/390 |

OTHER PUBLICATIONS

International Search Report for PCT/IB2008/051596 dated Dec. 4, 2008.
Written Opinion for PCT/IB2008/051596 dated Dec. 4, 2008.
European Office Action for European Application No. 08 751 102.8-2416 dated Oct. 16, 2012.

* cited by examiner

*Primary Examiner* — Phirin Sam
(74) *Attorney, Agent, or Firm* — Potomac Patent Group, PLLC (57) ABSTRACT

Systems and methods according to these exemplary embodiments provide for methods and systems for optimizing the distribution of media content for multiple end users over Internet protocol (IP) networks, such as the Internet.

22 Claims, 7 Drawing Sheets

SYSTEMS AND METHODS FOR MEDIA DISTRIBUTION

TECHNICAL FIELD

The present invention relates generally to communications systems and in particular to methods and systems for distributing media using, e.g., unicast and multicast transmissions.

BACKGROUND

As the level of technology increases, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally cellular phones and Wi-Fi have added a mobile element to communications. Similarly, in the entertainment industry, 30 years ago there was only one format for television and this format was transmitted over the air and received via antennas located at homes. This has evolved into both different standards of picture quality such as, standard definition television (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available through the network including the "last mile" to the end user.

Another related technology that impacts both the communications and entertainment industries is the Internet. The physical structure of the Internet and associated communication streams have also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other IP networks) as a mechanism for providing traditional services. These multimedia services include Internet Protocol television (IPTV, referring to systems or services that deliver television programs over a network using IP data packets), Internet radio, video, live events, voice over IP (VoIP), and other web related services received singly or bundled together.

One area of particular interest is the distribution of live events, e.g., sporting events, concerts and the like. These live events can be distributed as a live stream via cable, satellite and over the Internet. Typically when a live stream is distributed from a content provider over the Internet, it is transmitted as a unicast stream, e.g., one stream per end user from the content provider. Since the live broadcast generates one unicast stream per user viewing the event, a lot of bandwidth from the content provider's server infrastructure, as well as bandwidth in an operator's network connecting the content provider to the end user, could be expected to be used if enough people want to view that particular program. It may even be the case that, at some point, the number of viewers receiving a unicast version of the live program would need to be restricted based on the physical bandwidth capabilities available to provide unicast feeds of the program. Therefore it would be useful to optimize bandwidth usage when, for example, streaming the broadcast of a live event to lower the cost of distribution, allow for more end users to receive the broadcast and/or for improving the quality of the streamed media.

Accordingly the exemplary embodiments described herein provide systems and methods for optimizing the distribution of media content for multiple end users over Internet protocol (IP) networks, such as the Internet.

SUMMARY

Systems and methods according to the present invention address this need and others by providing systems and methods for optimizing the distribution of media content for multiple end users over Internet protocol (IP) networks, such as the Internet, for example, by reducing the amount of bandwidth used.

According to one exemplary embodiment a method for switching from a unicast transmission of a program to a multicast transmission of the program includes: requesting, by a client device, the program; receiving, at the client device, the unicast transmission of the program; receiving, at the client device, the multicast transmission of the program; and switching, by the client device, from the unicast transmission of the program to the multicast transmission of the program.

According to another exemplary embodiment a method for coordinating unicast and multicast transmissions of a program includes: transmitting, from a media server, a plurality of unicast streams associated with the program; determining, at the media server, to begin a multicast transmission of the program; and transmitting, from the media server, the multicast transmission of the program.

According to another exemplary embodiment a client device includes: a processor for requesting a program; a communications interface for receiving a unicast transmission of the program, wherein the communications interface at a later time receives a multicast transmission of the program; and a software application in conjunction with the processor for switching from the unicast transmission of the program to the multicast transmission of the program.

According to another exemplary embodiment a media server includes: a communications interface for transmitting a unicast transmission of the program, wherein the communications interface at a later time transmits a multicast transmission of the program; a processor for deciding when to switch from the unicast transmission to the multicast transmission of said program; and a software application in conjunction with the processor for switching from the unicast transmission of the program to the multicast transmission of the program.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
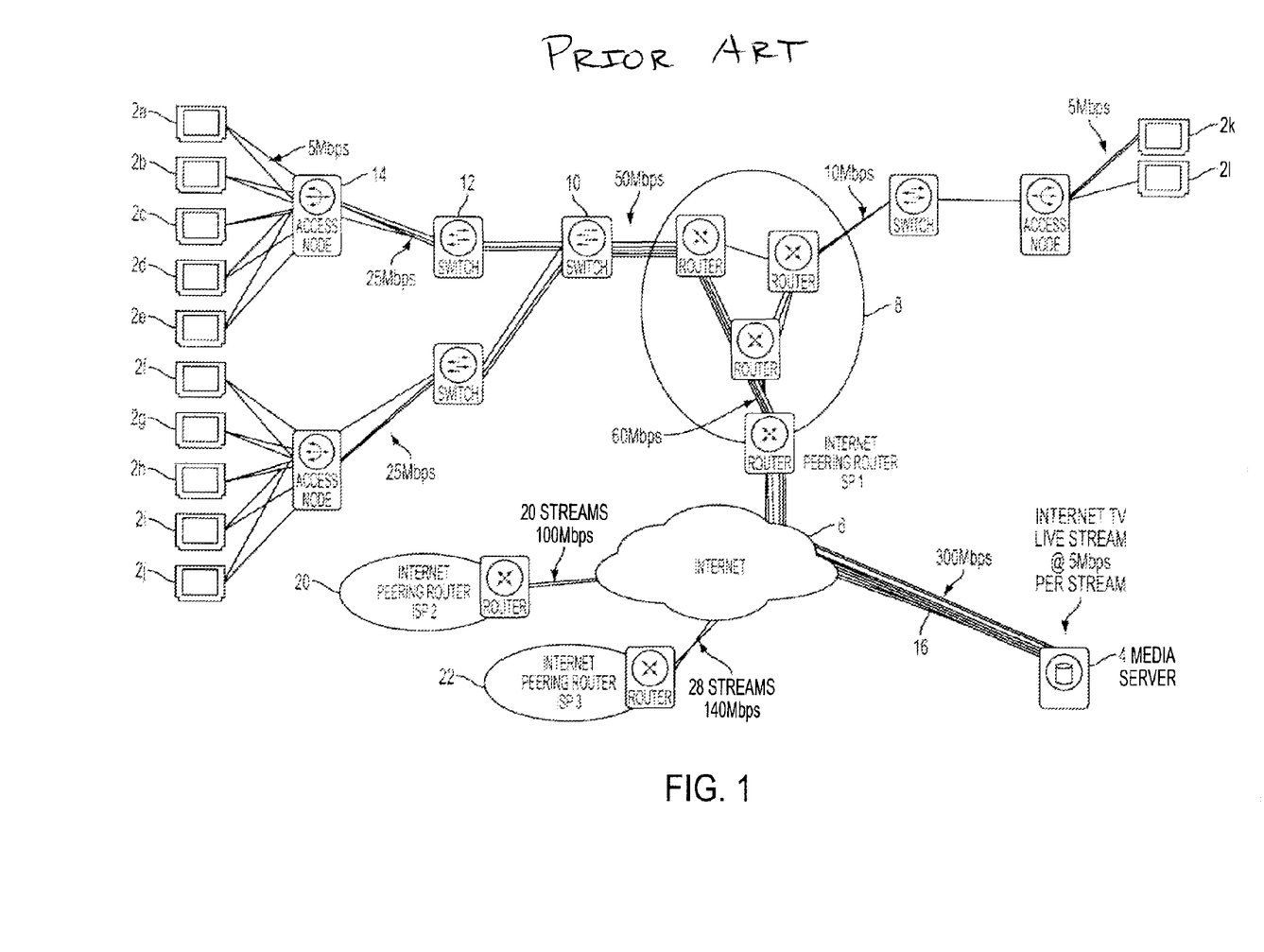
FIG. 1 illustrates a communications framework with unicast transmissions according to exemplary embodiments.

As mentioned above, it is desirable to provide systems and methods for optimizing the distribution of content for multiple end users who receive that content over an Internet protocol (IP) network, such as the Internet. In order to provide some context for this discussion, an exemplary communications framework is shown in FIG. 1 for distributing content, e.g., a live broadcast of a sporting event or concert or a broadcast event of other media content such as a pay per-view broadcast, to, for example, client devices from a media server, e.g., a content provider node or an Internet TV/live broadcast server. Exemplary client devices (2a-2l) that can be used to receive content, include, but are not limited to, laptop computers, personal computers (PCs), set-top boxes (STBs), media players, media centers, game boxes and other devices capable of receiving content over the Internet.

Using the exemplary communications framework shown in FIG. 1, an end user desiring to see a particular live event, on or through a client device (2a-2l), would connect to the media server 4 and receive a unicast stream of the live event. This connection process can involve, for example, an end user (or associated client device) requesting a particular program, e.g., by selecting a particular Internet protocol television (IPTV) channel. As used herein, the term "unicast" refers to a point-to-point connection between an end user or end user device and a content provider's system or server, e.g., a stream of IP packets associated with a program that are addressed solely to that end user/end user device. For purely illustrative purposes, as shown in FIG. 1, the unicast stream received by a single client device 2a utilizes a bandwidth of 5 megabytes per second (Mbps), although it will be appreciated by those skilled in the art that any given unicast stream could consume a larger or smaller bandwidth. Upon successfully requesting access to the event, a 5 Mbps unicast stream is transmitted from media server 4, through a portion of the Internet 6, to the operator network 8 of which the end user is a subscriber. From the operator network 8, the unicast stream continues through other hardware (switches 10, 12 and access node 14) to client device 2a. Additionally, it will be appreciated by those skilled in the art that more or fewer nodes can be in the transmission path than those illustrated in FIG. 1. At this point the end user can view the event.

In this example, for each end user desiring to view the event, a different 5 Mbps unicast stream is created. It can be seen from FIG. 1, that media server 4 is transmitting sixty unicast streams 16 which consume a total bandwidth of 300 Mbps. As compared to the single 5 Mbps unicast stream that an end user receives, this is a significant amount of bandwidth used at the content provider end. Additionally, depending upon the number of subscribers in an operator network 8 which desire to receive this particular event, a significant amount of operator bandwidth could be required in the aggregate. In order to reduce the required bandwidth associated with a large number of end users wishing to view an event being broadcast over the Internet, exemplary embodiments for switching from a plurality of unicast streams to a multicast stream over a communications framework will now be described.

Figure 2:
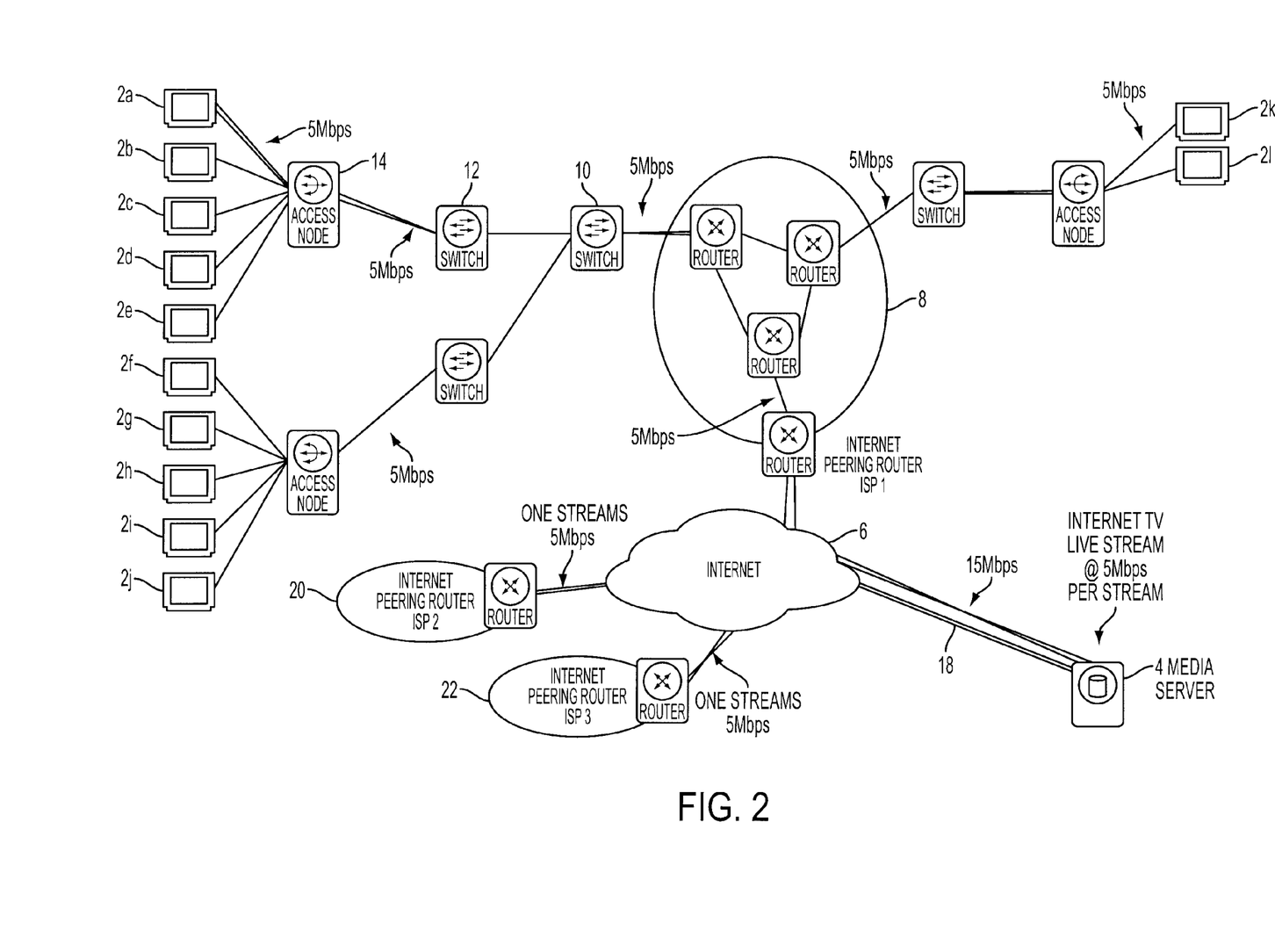
FIG. 2 shows a communications framework with multicast transmissions according to exemplary embodiments.

Initially, as described above with respect to FIG. 1, when an end user obtains access to a live broadcast event over the Internet 6, the event is transmitted as a unicast stream from the media server 4 to the end user's client device 2a. According to exemplary embodiments, when a configurable number, e.g., ten or more, of end users from the same operator network (Internet Protocol (IP)/sub-network) that supports multicast transmissions are viewing the same event, a multicast transmission of the event can be generated with some, or possibly all, of the end users being switched from their individual unicast transmissions to the multicast transmission of the event as shown in FIG. 2. As used herein, the term "multicast" refers to a broadcast or point-to-multipoint connection which is established between an end user or an end user's device and a content provider or content provider's equipment, e.g., a stream of IP packets which have an address associated with a group of potential recipients.

This multicast traffic can be distributed over a multicast enabled peering/transit network or tunneled from the content provider to the operator network. Once the decision is made by the media server 4 to switch from a plurality of unicast streams to a single, multicast stream in support of the distribution of a particular program, the media server 4 transmits messages to the various client devices (2a-2l) instructing the client devices (2a-2l) to change from their current unicast stream to a multicast stream of the event. The various client devices (2a-2l) will then selectively join the multicast stream as instructed by the media server 4 and as possibly modified by their respective operator networks. Comparing FIG. 1 to FIG. 2, it can be seen how the amount of bandwidth used is significantly less after switching to the multicast distribution of the program depicted in FIG. 2 as compared to the unicast distribution shown in FIG. 1. More specifically, comparing stream 16 using 300 Mbps in FIG. 1 to stream 18 using 15 Mbps in FIG. 2, this reduction of bandwidth carries through to varying degrees in the various operator networks (8, 20 and 22) whereby each of the operator networks (8, 20 and 22) is only receiving a 5 Mbps multicast stream as compared to relatively higher bandwidth values when receiving multiple unicast streams. After a client device 2a has switched from its unicast transmission to the multicast transmission, the client device 2a can terminate the unicast stream from media server 4. An exemplary process for switching from a unicast stream to a multicast stream according to exemplary embodiments will be described in more detail below with respect to FIGS. 3(a)-3(e).

Figure 3A:
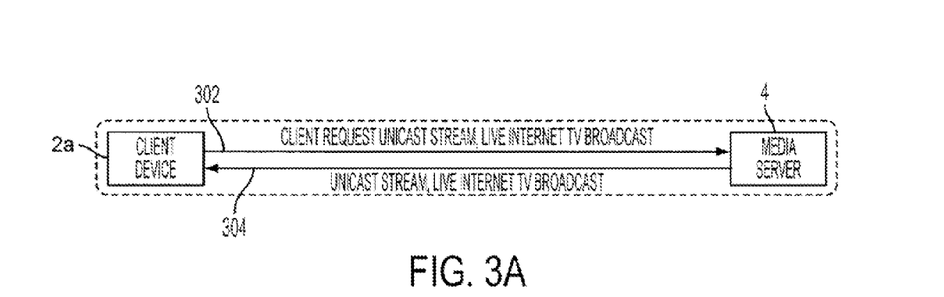
FIGS. 3(a)-3(e) illustrate changing from a unicast transmission of a program to a multicast transmission of the same program according to exemplary embodiments.
Figure 3B:
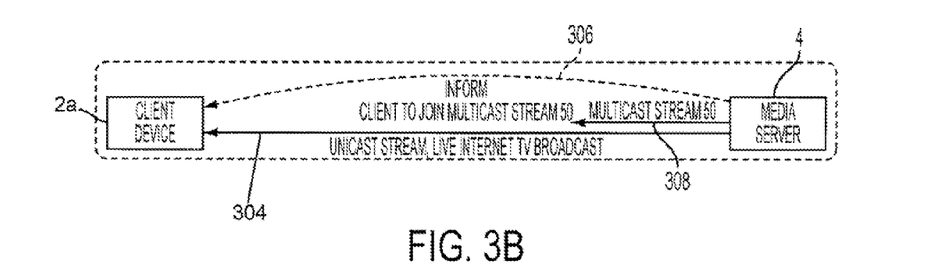
Figure 3C:
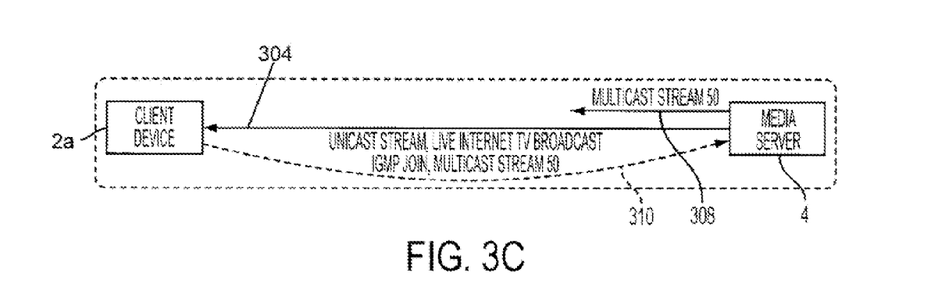

As shown in the exemplary flow diagram of FIG. 3(a), a client device 2a initially requests a live Internet TV broadcast 302 from media server 4. Media server 4 responds by transmitting a unicast stream 304 of the live Internet TV broadcast to the client device 2a through an exemplary communications network as shown in FIGS. 1 and 2. After a number of end users in a desired grouping, e.g., within the same operator's network, are viewing the same live Internet TV broadcast via their respective, unicast streams, the media server 4 transmits a message 306 to client device 2a informing the client device 2a to join multicast stream 308. More specifically, message 306 includes information about a specific multicast group to join and, if desired, the multicast source. Multicast stream 308 is then broadcast from the media server 4 as shown in FIG. 3(b). In FIG. 3(c), the client device 2a initiates messages using, for example, Internet Group Management Protocol (IGMP) in order to join multicast stream 308.

Figure 3D:
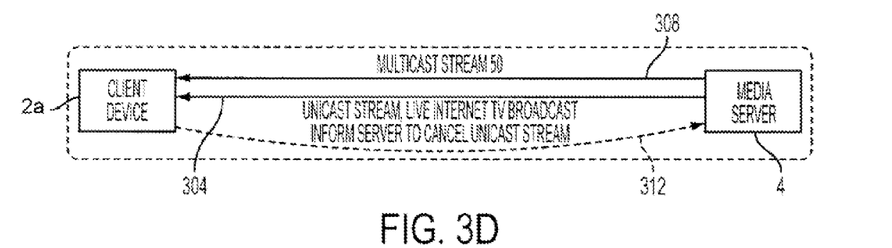
Figure 3E:
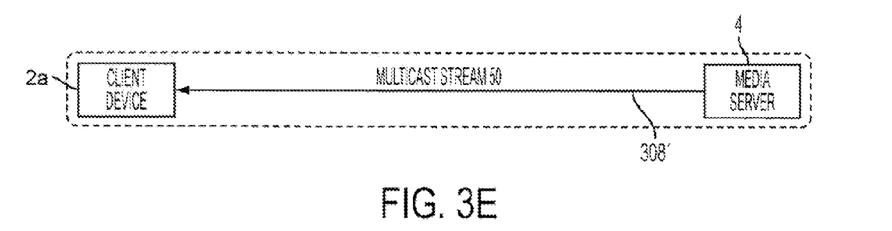

Upon completion of IGMP messaging to join the multicast stream 308, the client device 2a is receiving both the multicast stream 308 of the transmission as well as the unicast stream 304 of the transmission. After the unicast and multicast streams are synchronized, the client device 2a transmits a message 312 to the media server 4 to cancel the unicast stream 304 as shown in FIG. 3(d). This results in the client device 2a being able to receive the desired live Internet TV broadcast from the multicast stream 308 as shown in FIG. 3(e).

The exemplary embodiments described above, can use a predetermined number, e.g., ten or more, end users or unicast streams associated with the same program from the same operator network as being the trigger for media server 4 for deciding to switch from unicast streams to a multicast stream. The decision threshold may be fixed or variable. However, according to other exemplary embodiments, other factors can be used to determine when to switch over from plural unicast streams to a multicast stream. Many different factors can be used, either alone or in combination, for deciding when to switch from plural unicast streams to a multicast stream for the same broadcast, program or media content. For example, this decision could be dependent upon the type of program being viewed, e.g., a program requiring a higher bandwidth could switch to a multicast stream after five or more viewers have requested that program. Alternatively, the decision could be based upon both the number of viewers and the bandwidth availability in different operator networks. Other potential factors can include, without limitation, pre-determined arrangements with an operator network, cost factors, changes in available bandwidth during the broadcast and received requests from operator networks during the broadcast.

Regarding the decision making node, according to exemplary embodiments, alternatives to the media server 4 as a physical location for making the switching decision are also possible. For example, the decision making node could be in an operator network that requests a multicast stream when the number of end users in its network exceeds a number, e.g., 2. The decision making node could also be an integrated part of the media server or a node in the content provider's domain that is in communication with, but separate from, the media server 4.

The exemplary embodiments described above describe a client device 2a initially receiving a unicast transmission of a live Internet TV transmission and then switching to a multicast transmission of the same program. If, however, a live Internet TV broadcast is already, e.g., at the time that an end user selects a channel associated with that program, being transmitted as a multicast transmission which the end user can access, then the end user would join into the multicast instead of receiving a unicast transmission and then switching to the multicast channel. According to another exemplary embodiment, when the media server 4 instructs the client device 2a to join the multicast stream, the media server can also distribute decryption keys to decrypt an encrypted multicast stream as desired or required.

According to exemplary embodiments described above, media server 4 can interact with operator networks (8, 20 and 22) that are themselves capable of interacting with multicast streams. At some point in time, to implement the unicast to multicast switching described above a multicast channel for each of the operator networks (8, 20 and 22) needs to be defined or established for a live event. Additionally, other information can be transmitted between media server 4 and the operator networks (8, 20 and 22) and used to aid in determining when to switch from plural unicast streams to a single multicast stream, such as available bandwidth, quality of service information as well as specific information regarding the operator to end user relationship. For example, the operator may not allow some end user's in their network to receive multicast transmissions, some end user's in their network may only desire to receive unicast transmissions or the end user's video output capabilities may be different from the offering on the multicast stream. This information can impact which end users are allowed by the operator networks (8, 20 and 22) to join certain multicast channels, e.g., channels in standard definition television (SDTV) and high definition television (HDTV). This information from the operator networks (8, 20 and 22) can be sent to the content provider as needed, or in some cases it is pre-determined. Depending upon the method used in distributing the multicast stream, other information can be exchanged between the operator network (8, 20 or 22) and the content provider. For example, when tunneling is used there should be an agreement between the content provider and the operator network (8, 20 or 22) in order to terminate the tunnel when appropriate. In the case of the operator network (8, 20 or 22) supporting a multicast over the Internet, there may be an agreement when supporting multicast but no specific agreement is required.

Figure 4:
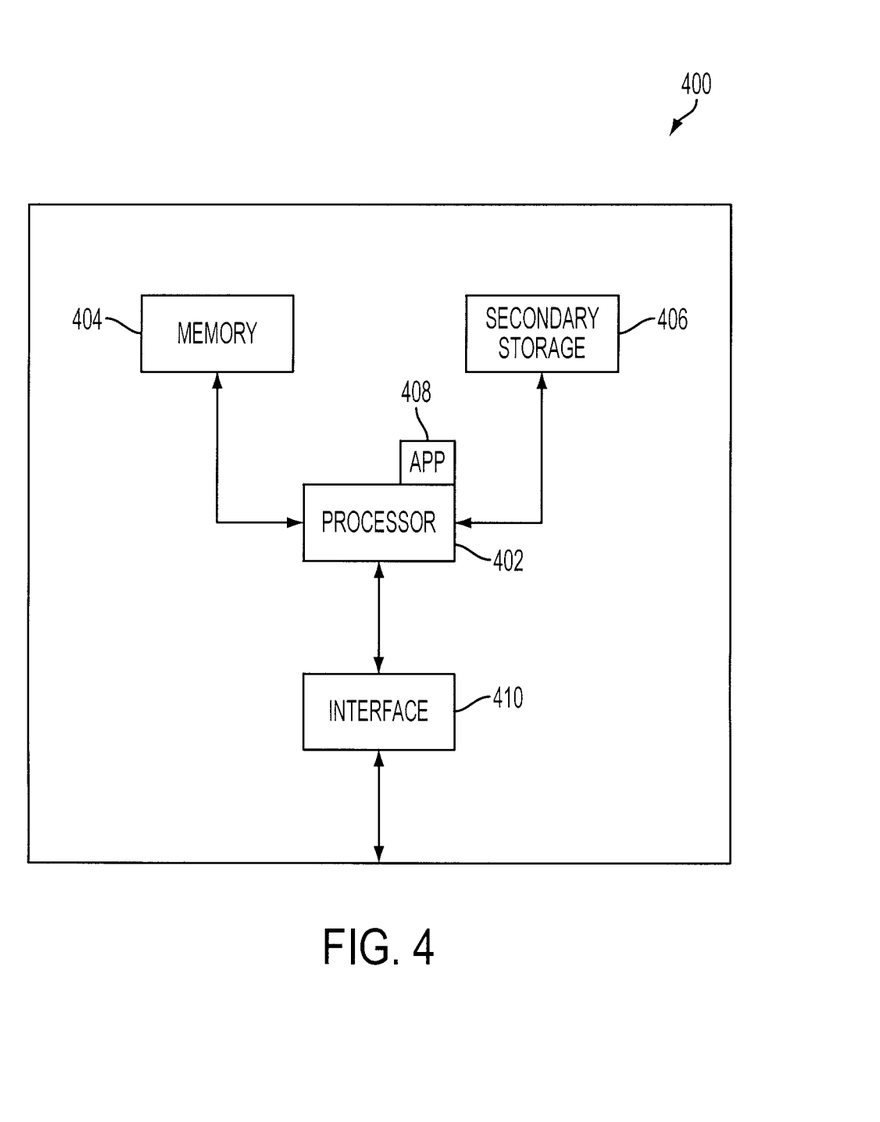
FIG. 4 shows a communication node according to exemplary embodiments.

The exemplary embodiments described above, illustrate methods and systems for switching a device which is viewing a unicast transmission to join a multicast transmission of the same program. An exemplary communications node 400, representing a client device 2a capable of receiving media content over the Internet and/or a media server capable of transmitting media content over the Internet, will now be described with respect to FIG. 4. Communications node 400 can contain a processor 402 (or multiple processor cores), memory 404, one or more secondary storage devices 406, a software application (or multiple applications) 408 and an interface unit 410 to facilitate communications between communications node 400 and the rest of the network. The memory 404 (or secondary storage devices 406) can be used for storage of the media content or a subset of the media content. The software application 408 in conjunction with the processor 402 and memory 404 can execute instructions for switching from unicast to multicast. Thus, a communications node according to an exemplary embodiment may include a processor 402, memory 404 and software application(s) 408 that is capable of sending/receiving messages and media content over the Internet as either a unicast or a multicast transmission. Additionally, communications node 400 can act as a decision making node for deciding when to switch from multiple unicast streams of a program to a multicast stream of the same program.

Figure 5:
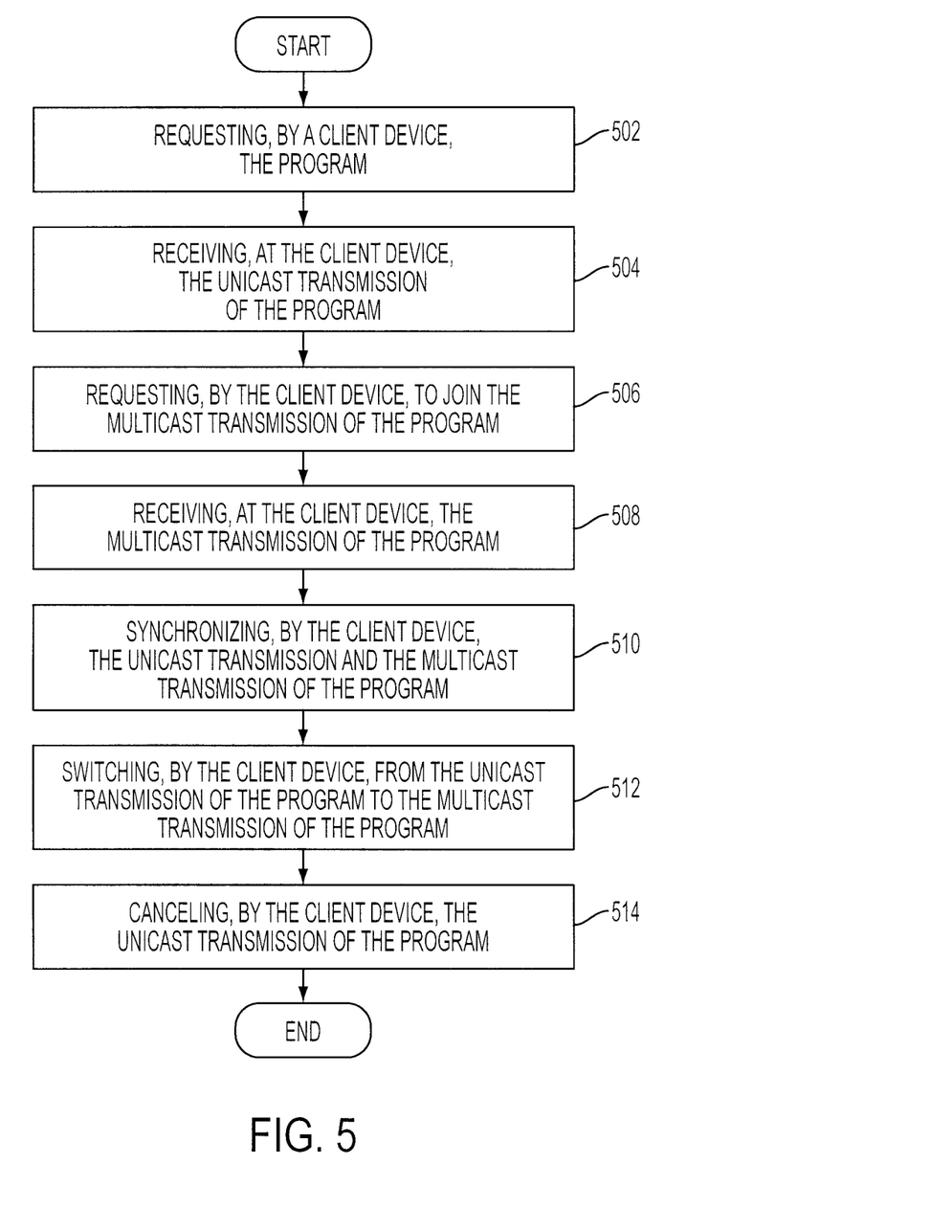
FIG. 5 illustrates a method flow chart for switching from a unicast transmission of a program to a multicast transmission of the same program by a client device according to exemplary embodiments.

Utilizing the above-described exemplary systems according to exemplary embodiments, a method for switching from a unicast transmission of a program to a multicast transmission of the same program by a client device is shown in the flowchart of FIG. 5. Initially a method for switching from a unicast transmission of a program to a multicast transmission of the program includes: requesting, by a client device, the program in step 502; receiving, at the client device, said unicast transmission of said program in step 504; requesting, by the client device, to join the multicast transmission of the program at step 506; receiving, at said client device, said multicast transmission of said program in step 508; synchronizing, by the client device, the unicast transmission and the multicast transmission of the program in step 510; switching, by said client device, from said unicast transmission of said program to said multicast transmission of said program in step 512; and canceling, by the client device, the unicast transmission of the program in step 514.

Figure 6:
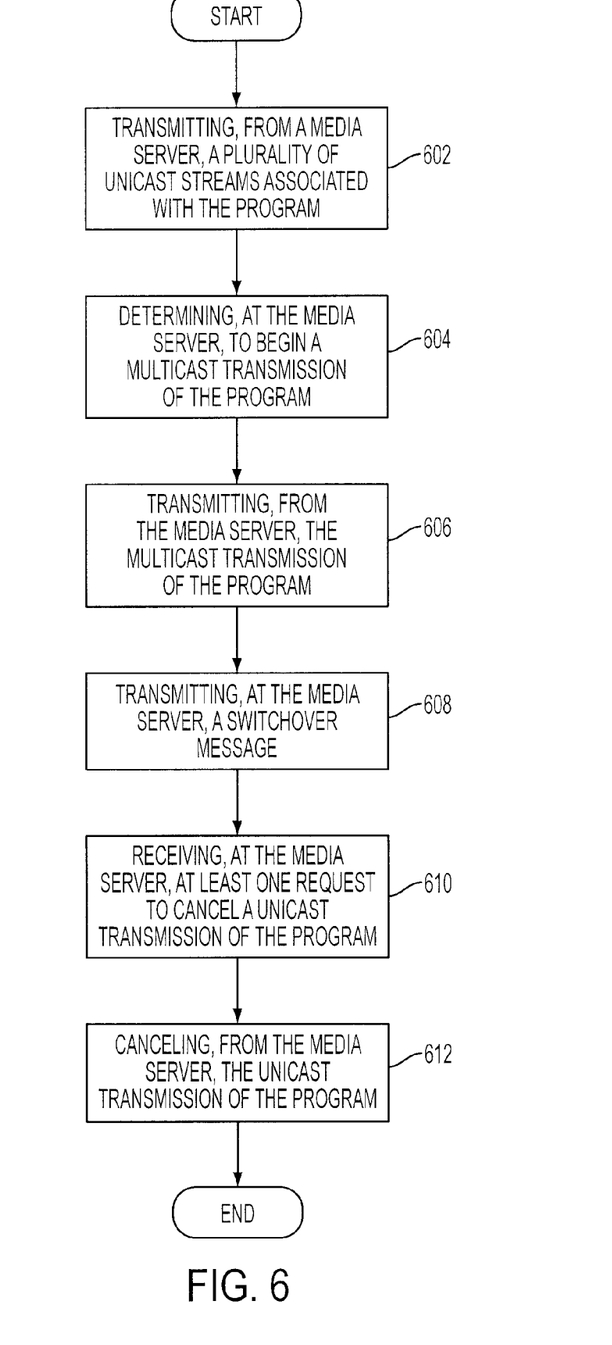
FIG. 6 illustrates a method flow chart for switching from a unicast transmission of a program to a multicast transmission of the same program by a media server according to exemplary embodiments.

Utilizing the above-described exemplary systems according to exemplary embodiments, a method for switching from a unicast transmission of a program to a multicast transmission of the same program by a media server is shown in the flowchart of FIG. 6. Initially a method for coordinating unicast and multicast transmissions of a program includes: transmitting, from a media server, a plurality of unicast streams associated with the program in step 602; determining, at the media server, to begin a multicast transmission of the program in step 604; and transmitting, from the media server, the multicast transmission of the program in step 606. Additionally, other steps can occur at the media server, such as, transmitting, at the media server, the switchover message in step 608; receiving, at the media server, at least one request to cancel a unicast transmission of the program in step 610; and canceling, from the media server, the unicast transmission of the program in step 612. In this exemplary embodiment, the switchover message is sent to the desired client devices, which upon receipt switch over from the unicast program to the multicast transmission of the same program. However, as described above in other embodiments, this switchover can also be done by the client devices when they have both transmissions synchronized, and not just switching over when receiving a switchover message from the media server.

The foregoing exemplary embodiments describe software, methods, systems and devices for media distribution involving the switching between a plurality of unicast streams and a multicast stream. In particular, this switching involves unicast streams and multicast streams associated with the same "chunk" of media content, referred to herein as a "program". It will be understood that the term "program" as used herein is intended to be generic to all types, formats and sizes of media content regardless of origin or distribution mechanism, e.g., including television, video, music, gaming, or other multimedia chunks.

The above-described exemplary embodiments are intended to be illustrative in all respects, rather than restrictive, of the present invention. All such variations and modifications are considered to be within the scope and spirit of the present invention as defined by the following claims. For example, media server 4 could include instructions for initiating a multicast transmission of a live event even though fewer than 10 end users in an operators' network are viewing the event. No element, act, or instruction used in the description of the present application should be construed as critical or essential to the invention unless explicitly described as such. Also, as used herein, the article "a" is intended to include one or more items.

What is claimed is:

1. A method for switching from a unicast transmission of a program to a multicast transmission of said program comprising:
   requesting, by a client device, said program;
   receiving, at said client device, said unicast transmission of said program;
   receiving, at said client device, a message informing said client device that said client device will be joining a multicast channel which includes said program;
   receiving, at said client device, said multicast transmission of said program;
   switching, by said client device, from said unicast transmission of said program to said multicast transmission of said program; and
   receiving, at said client device, a message requesting that said client device join a multicast channel which includes said program.

2. The method of claim 1, further comprising:
   transmitting, by said client device, a message requesting cancellation of said unicast transmission of said program.

3. The method of claim 1, wherein said client device is at least one of a personal computer, a set-top box, a media center, a media player and a game box.

4. The method of claim 1, wherein said program is a broadcast event.

5. The method of claim 4, wherein said broadcast event is at least one of a sporting event, a concert and a pay per-view broadcast.

6. The method of claim 1, wherein said message requesting that said client device join said multicast channel which includes said program is received by said client device if the number of client devices receiving said unicast transmission of said program in an operator network exceeds a threshold.

7. A method for coordinating unicast and multicast transmissions of a program comprising:
   transmitting, from a media server, a plurality of unicast streams associated with said program;
   determining, at said media server, to begin a multicast transmission of said program;
   transmitting, from said media server, said multicast transmission of said program; and
   transmitting, from said media server, a message informing recipients of said plurality of unicast streams associated with said program to loin a multicast channel; and
   receiving requests, at said media server, to join said multicast channel which includes said program.

8. The method of claim 7, further comprising:
   receiving, at said media server, at least one request to cancel a unicast transmission of said program; and
   canceling, from said media server, said unicast transmission of said program.

9. The method of claim 7, further comprising:
   transmitting, at said media server, a switchover message.

10. The method of claim 7, wherein said program is a broadcast event.

11. The method of claim 10, wherein said broadcast event is at least one of a sporting event, a concert, and a pay per-view broadcast.

12. The method of claim 7, wherein said step of determining, at said media server, to begin a multicast transmission of said program is based upon the number of client devices receiving said unicast transmission of said program in an operator network.

13. The method of claim 12, wherein said number is two or greater.

14. A client device comprising:
   a processor for requesting a program;
   a communications interface for receiving a unicast transmission of said program, wherein said communications interface at a later time receives a multicast transmission of said program, and for receiving a request to join a multicast channel which includes said program; and
   a software application in conjunction with said processor for switching from said unicast transmission of said program to said multicast transmission of said program based upon a response to said request.

15. The method of claim 14, wherein said client device is at least one of a personal computer, a set-top box, a media center, a media player and a game box.

16. The client device of claim 14, wherein said request to join said multicast channel is based upon the number of client devices receiving said unicast transmission of said program.

17. A media server comprising:
- a communications interface for transmitting a unicast transmission of said program, wherein said communications interface at a later time transmits a multicast transmission of said program;
- a processor for deciding when to switch a recipient from said unicast transmission to said multicast transmission of said program, said decision being based, at least in part, on a request from the recipient; and
- a software application in conjunction with said processor for switching said recipient from said unicast transmission of said program to said multicast transmission of said program.

18. The media server of claim 17, wherein said communications interface can transmit multiple unicast transmissions of said program and a multicast transmission of said program at the same time.

19. The media server of claim 17, wherein said decision when to switch a recipient from said unicast to said multicast transmission of said program is based upon the number of recipients receiving said unicast transmission of said program.

20. A method, in a network node having a processor and memory, of switching a plurality of devices receiving a unicast transmission of a program to receiving a multicast transmission of the program, said method comprising:
- determining a number of said plurality of said devices receiving said unicast transmission of the program that are capable of receiving said multicast transmission of the program;
- if said number exceeds a first threshold, sending each of said number of said plurality of said devices a request to switch to said multicast transmission of the program;
- determining another number of devices from said number of said plurality of devices which have, in response to said request, selected to switch to receiving said multicast transmission of the program; and,
- if said another number of devices which have selected to switch exceeds a second threshold, switching each of said another number of devices to receiving said multicast transmission of the program.

21. The method of claim 20, wherein said number of devices capable of receiving said multicast transmission is based, at least in part, on whether the devices are from the same operator network.

22. The method of claim 20, wherein said number of devices capable of receiving said multicast transmission is based, at least in part, on the video output capabilities of each device.

* * * * *

UNITED STATES PATENT AND TRADEMARK OFFICE
CERTIFICATE OF CORRECTION

| | | |
|---|---|---|
| PATENT NO. | : 8,542,682 B2 | Page 1 of 1 |
| APPLICATION NO. | : 12/937270 | |
| DATED | : September 24, 2013 | |
| INVENTOR(S) | : Thyni et al. | |

It is certified that error appears in the above-identified patent and that said Letters Patent is hereby corrected as shown below:

In the Claims:

In Column 8, Line 32, in Claim 7, delete "loin" and insert -- join --, therefor.

In Column 8, Line 65, in Claim 15, delete "method" and insert -- device --, therefor.

Signed and Sealed this
Eighteenth Day of February, 2014

Michelle K. Lee
*Deputy Director of the United States Patent and Trademark Office*